US009913159B2

(12) United States Patent
Hiremath et al.

(10) Patent No.: US 9,913,159 B2
(45) Date of Patent: Mar. 6, 2018

(54) ADJUSTING OPERATING WINDOWS OF A DUAL-MODE DEVICE OPERATING AS AN ACCESS POINT AND A WIRELESS STATION IN TIME DIVISION MULTIPLEXED MANNER

(71) Applicant: GainSpan Corporation, San Jose, CA (US)

(72) Inventors: Indudharswamy G Hiremath, Bangalore (IN); Shyju Narangaprath, Bangalore (IN)

(73) Assignee: GainSpan Corporation, San Jose, CA (US)

( * ) Notice: Subject to any disclaimer, the term of this patent is extended or adjusted under 35 U.S.C. 154(b) by 29 days.

(21) Appl. No.: 14/753,050

(22) Filed: Jun. 29, 2015

(65) Prior Publication Data

US 2016/0294713 A1   Oct. 6, 2016

(30) Foreign Application Priority Data

Apr. 1, 2015 (IN) ........................... 1763/CHE/2015

(51) Int. Cl.
*H04W 24/10* (2009.01)
*H04W 88/08* (2009.01)
(Continued)

(52) U.S. Cl.
CPC .......... *H04W 24/10* (2013.01); *H04B 7/2643* (2013.01); *H04W 56/00* (2013.01); *H04W 48/12* (2013.01); *H04W 88/085* (2013.01)

(58) Field of Classification Search
CPC ..... H04W 88/06; H04W 24/10; H04W 48/12; H04W 56/00; H04M 3/42246
See application file for complete search history.

(56) References Cited

U.S. PATENT DOCUMENTS 7,440,754 B2  10/2008  Bahl et al.
7,814,322 B2  10/2010  Gurevich et al.
(Continued)

OTHER PUBLICATIONS

Xue Yang, Jing Zhu, Xingang Guo, "Study on Intermittent WLAN Consisting of Heterogeneous Multi-radio Devices", Wireless and Mobile Networking IFIP International Federation for Information Processing, Series ISSN 1868-4238, date 2008, pp. 311-328, vol. 284, Springer US.

(Continued)

*Primary Examiner* — Ayaz Sheikh
*Assistant Examiner* — Debebe Asefa
(74) *Attorney, Agent, or Firm* — Pearl Cohen Zedek Latzer Baratz LLP

(57) ABSTRACT

A dual-mode device may compute an expected time instance of arrival of a first beacon based on prior received beacons. If the first beacon is received at an actual time instance which is in variance with the expected time instance, the device re-computes a sequence of future time instances of arrival of respective future beacons and schedules a sequence of station windows, with each station window to cover the corresponding future time instance of the sequence of future time instances and to have a desired first period. The dual-mode device operates in station mode in the sequence of station windows and in the AP mode in a sequence of AP windows, wherein each station window of the sequence of station windows is operated alternately with each AP window of the sequence of AP windows in a TDM manner, with each AP window having a desired second period.

20 Claims, 5 Drawing Sheets

(51) Int. Cl.
    *H04W 48/12*     (2009.01)
    *H04W 56/00*     (2009.01)
    *H04B 7/26*     (2006.01)

(56) References Cited

U.S. PATENT DOCUMENTS

| | | |
|---|---|---|
| 8,165,102 B1 | 4/2012 | Vleugels et al. |
| 8,694,624 B2 | 4/2014 | Sinha et al. |
| 8,837,353 B2 | 9/2014 | Yuan |
| 2005/0165916 A1 | 7/2005 | Cromer et al. |
| 2013/0044739 A1 | 2/2013 | Huang |
| 2013/0315141 A1 | 11/2013 | Homchaudhuri et al. |
| 2013/0343350 A1* | 12/2013 | Weinrib ............... H04B 7/2643 370/336 |
| 2014/0010219 A1 | 1/2014 | Dor et al. |
| 2014/0258723 A1* | 9/2014 | Zhang .................... H04L 63/08 713/168 |
| 2016/0198327 A1* | 7/2016 | Park ...................... H04L 27/261 370/330 |

OTHER PUBLICATIONS

Hanno Wirtz, Tobias Heer, Robert Backhaus, Klaus Wehrle, "Establishing Mobile Ad-Hoc Networks in 802.11 Infrastructure Mode", WiNTECH '11 Proceedings of the 6th ACM international workshop on Wireless network testbeds, experimental evaluation and characterization, ISBN: 978-1-4503-0867-0, date 2011, pp. 89-90, publisher: ACM New York, NY, USA.

\* cited by examiner

ADJUSTING OPERATING WINDOWS OF A DUAL-MODE DEVICE OPERATING AS AN ACCESS POINT AND A WIRELESS STATION IN TIME DIVISION MULTIPLEXED MANNER

PRIORITY CLAIMS

The instant patent application claims priority from co-pending India provisional patent application entitled, "METHODS FOR MAINTAINING OPERATING WINDOWS IN TIME DIVISION MULTIPLEXED WLAN CONCURRENT MODES", Application Number: 1763/CHE/2015, Filed: Apr. 1, 2015, naming Mr. Indudharswamy G Hiremath as the sole-inventor, and is incorporated it its entirety herewith, to the extent not inconsistent with the content of the instant application.

BACKGROUND

Technical Field

The present disclosure relates to wireless networks, and more specifically to adjusting operating windows of a dual-mode device operating as an access point and a wireless station in time division multiplexed manner.

Related Art

An access point ("AP") refers to a switching device, which receives packets from a wireless station and forwards the packet to or towards a target device. A wireless station ("station") on the other hand is the source or destination in the wireless network (e.g., WLAN) of such packets. The target (or destination) device is often another station in the same wireless network, though it can be a device connected through the Internet via the access point. The access point communicates with the wireless devices using protocols such as those defined according to IEEE 802.11 standards.

In a typical implementation, the AP and the station are separate devices in the wireless network. However, the AP and the station may also be implemented in a single device, referred to as a dual-mode device. The dual-mode device supports the execution of the AP and the station as two different modes within the single device. Such dual-mode of operation may be based on time division multiplexing (TDM), implying that the shared wireless medium is operated in station mode and AP mode in alternate non-overlapping durations, as is well known in the relevant arts.

The dual-mode device can operate in accordance with TDM by executing separate operating windows for the corresponding modes, during which time corresponding signals are transmitted. Thus, each of the AP and station modes has a corresponding operating window. An operating window refers to a time duration in which a single mode of the dual-mode device operates, marked by start and end boundaries.

There may be a general need to adjust operating windows of dual-mode devices, typically to ensure that packet transmissions are not lost at the receiving device. Adjusting implies modifying the time duration, i.e., the start and/or end boundaries, of the operating windows.

Aspects of the present disclosure are directed to techniques for adjusting operating windows of a dual-mode device operating as an access point and a station in time division multiplexed manner.

BRIEF DESCRIPTION OF THE VIEWS OF DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A dual-mode device provided according to an aspect of the present disclosure computes an expected time instance of arrival of a first beacon based on prior received beacons. If the first beacon is received at an actual time instance which is in variance with the expected time instance, the device re-computes a sequence of future time instances of arrival of respective future beacons and schedules a sequence of station windows, with each station window to cover the corresponding future time instance of the sequence of future time instances and to have a desired first period. The dual-mode device operates in station mode in the sequence of station windows and in the AP mode in a sequence of AP windows, wherein each station window of the sequence of station windows is operated alternately with each AP window of the sequence of AP windows in a TDM manner, with each AP window having a desired second period.

Each of the station windows has a start boundary and an end boundary, wherein the first period represents magnitude of time between the start boundary and the end boundary. The device determines a magnitude of the variance, and utilizes the magnitude of the variance to set the start boundary of each of the sequence of station windows and is based on the actual time instance as a reference.

According to an aspect of the present disclosure, the first beacon is received from a remote access point, which locally measures the desired period (length of the beacon interval), for example, as a number of clock cycles (timer) of an internal clock. The desired period may be expressed in terms of micro-seconds and communicated to the dual-mode device operating as a station. The station may also measure the desired period locally, for example, as a number of clock cycles (timer) of a local clock. When the local clock of one of the AP and station drifts, there is a mismatch in the period measured at the two ends, resulting in the variance. The timer at the stations is adjusted to compensate for the variance, in scheduling the subsequent station windows at the station.

The remote access point and the dual-mode device are in accordance with 802.11 standards. The remote access point and the station mode of the dual-mode device operate in a first basic service set (BSS), and the AP mode of the dual-mode device and a set of stations operate in a second BSS.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
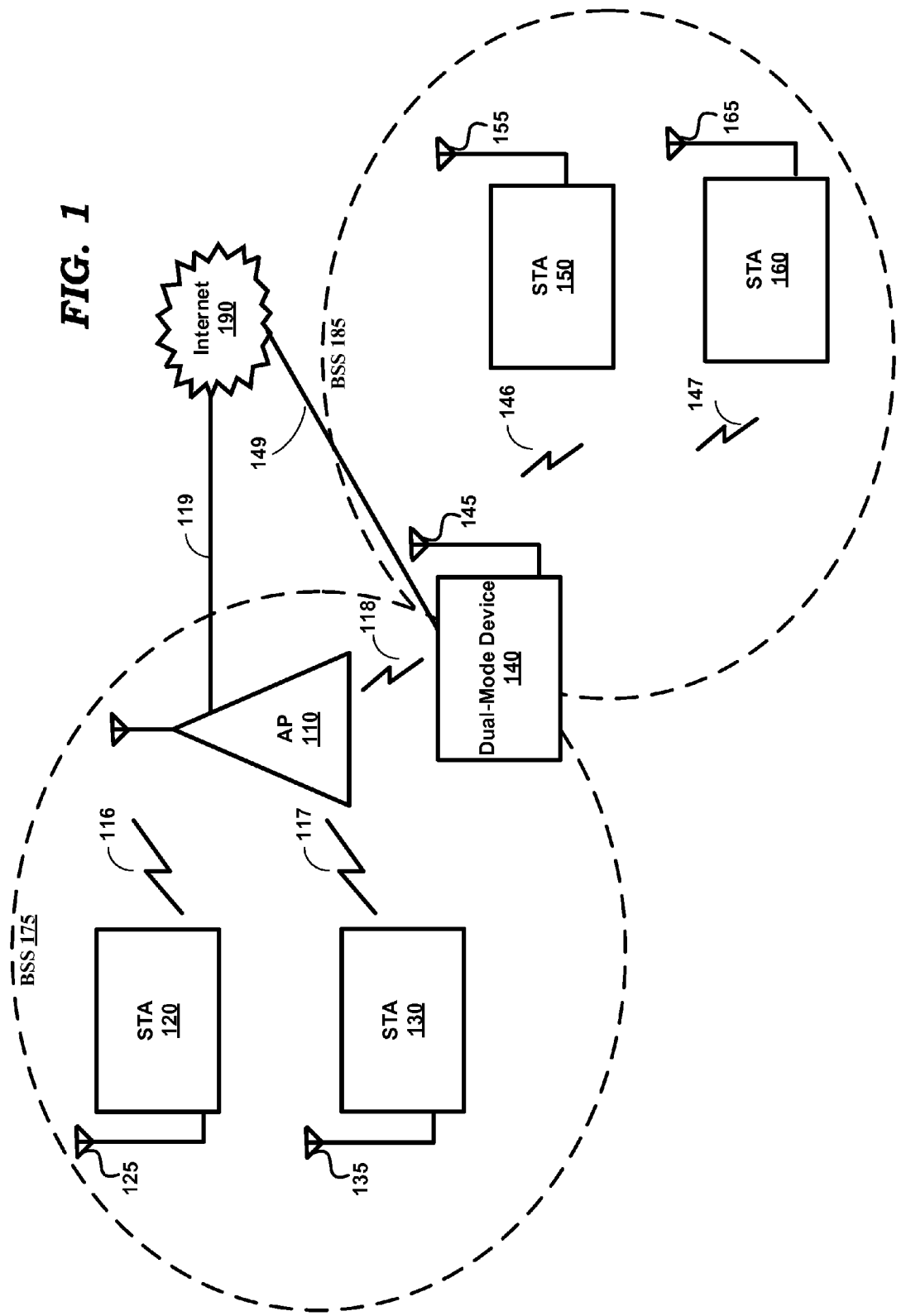
FIG. 1 is a block diagram of an example environment in which several aspects of the present disclosure may be implemented.

FIG. 1 is a block diagram representing an example environment in which several aspects of the present disclosure can be implemented. The example environment is shown containing only representative devices and systems for illustration. However, real world environments may contain more or fewer systems/devices. FIG. 1 is shown containing basic service sets (BSS) 175 and 185 and internet 190.

AP 110, STA (station) 120, STA 130 are shown part of BSS 175, and STA 150 and STA 160 are shown part of BSS 185, consistent with IEEE 802.11 family of standards. Dual-mode device 140 is shown present in both BSS 175 and 185 representing that device 140 acts as a station in BSS 175 and as a AP in BSS 185.

Internet 190 extends the connectivity of devices in BSS 175 and BSS 185 to various systems (not shown) connected to, or part of, internet 190. Internet 190 is shown connected to AP 110 through a wired path 119, and to dual-mode device 140 through a wired path 149. Internet 190 may be implemented using protocols such as IP. In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across WLANs.

An IP packet is said to be directed to a destination system when the destination IP address of the packet is set to the IP address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

AP 110 represents a switch operating according to IEEE 802.11 family of standards, and enables associated stations (e.g., STA 120 and STA 130) to communicate with each other as well as with systems connected to Internet 190. AP 110 is connected by a wired medium (119) to Internet 190.

Each of STAs 120, 130, 150 and 160 represents an end device that may execute various user applications. STAs 120, 130, 150 and 160 may correspond, for example, to laptop computers, smart phones, or wireless sensors. STAs 120 and 130 may communicate with each other via AP 110, and STAs 150 and 160 may communicate with each other via dual-mode device 140.

Paths 116 and 117 represent a direct wireless path between STAs 120 and 130 and AP 110 respectively. Thus, one or both of STAs 120 and 130 may communicate with devices in internet 190 also via AP 110. Similarly, paths 146 and 147 represent a direct wireless path between STAs 150 and 160 and the dual-mode device 140 respectively. Thus, one or both of STAs 150 and 160 may communicate with devices in internet 190 also via dual-mode device 140, while the dual-mode device 140 operates in AP mode. Path 118 represents a direct wireless path between dual-mode device 140 and AP 110, while the dual-mode device operates in station mode. The antenna of STA 120 is shown numbered as 125. Similarly, antennas of STAs 130, 150 and 160 are shown numbered as 135, 155, and 165 respectively.

While the components and devices of FIG. 1 are noted as being designed to operate according to IEEE 802.11 family of standards, in other embodiments, the components and devices of FIG. 1 may be designed to operate consistent with other wireless standards such as, for example, IEEE 802.15.4.

Dual-mode device 140 represents a device that operates as an AP and a station in accordance with time division multiplexing (TDM), as described above. Therefore, during operation as a station, dual-mode device 140 operates in a similar fashion as each of the STAs 120 and 130 in BSS 175, and similarly, during operation as an access point, dual-mode device 140 operates in a similar fashion as AP 110 but in BSS 185. Therefore, the description of the dual-mode device's operation as AP and as a station is not repeated here for conciseness.

As noted above, each mode of the dual-mode device 140 operates during a corresponding operating window. The operating window refers to a time duration that is marked by start and end boundaries. The magnitude of time, e.g., in milliseconds, that is encompassed by the start and end boundaries of the operating window may be referred to as a time period for that window instance.

In the dual-mode device 140, the time periods for the AP and station modes are allocated such that both the modes are fairly serviced. An administrator typically allocates the time periods for both the modes to ensure neither BSS is starved of operating time, as well as to satisfy any application or user requirements. For example, an administrator can allocate 20 ms for the station mode's time period and 80 ms for the AP mode's time period.

The time periods may be allocated by the administrator as fixed-values (e.g., 20 ms, 80 ms), or as a ratio (e.g., time periods distributed in a 1:4 ratio between the station and AP modes respectively). In case the ratio approach is used, the magnitude of the respective time periods is determined according to the pre-determined ratio, in conjunction with the beacon interval (i.e., the time-interval between successive beacon transmissions). For example, if the beacon interval is 100 ms, and the pre-determined ratio between the station and AP modes is 1:4, then the time period for operation as a station will be set at 20 ms, and the time period for operation as an AP will be set at 80 ms. In either the fixed-value or ratio approach, the administrator may set a maximum operating time period for completing one operating cycle of the dual-mode device 140. The operating cycle may be defined as operation of the dual-mode device 140 once as a station followed by operating once as an AP.

Further, the time duration, i.e., the start and end boundaries, of the operating windows are configured such that all packets destined to the dual-mode device 140 (while operating as a station) are received, and all packets destined to be sent from the dual-mode device 140 (while operating as an AP) are sent, without any packet loss.

However, the period (and thus boundaries) of the operating windows may change over the course of time impacting the corresponding time periods, due one or more reasons such as clock drift. In such a case, there may be a general need to adjust operating windows of the dual-mode device, to ensure there is no associated packet loss during transmission due to shrinking or expanding of operating windows. Aspects of the present disclosure relate to adjusting operating windows of the dual-mode device, as described below with examples.

3. Adjusting Operating Windows

Figure 2:
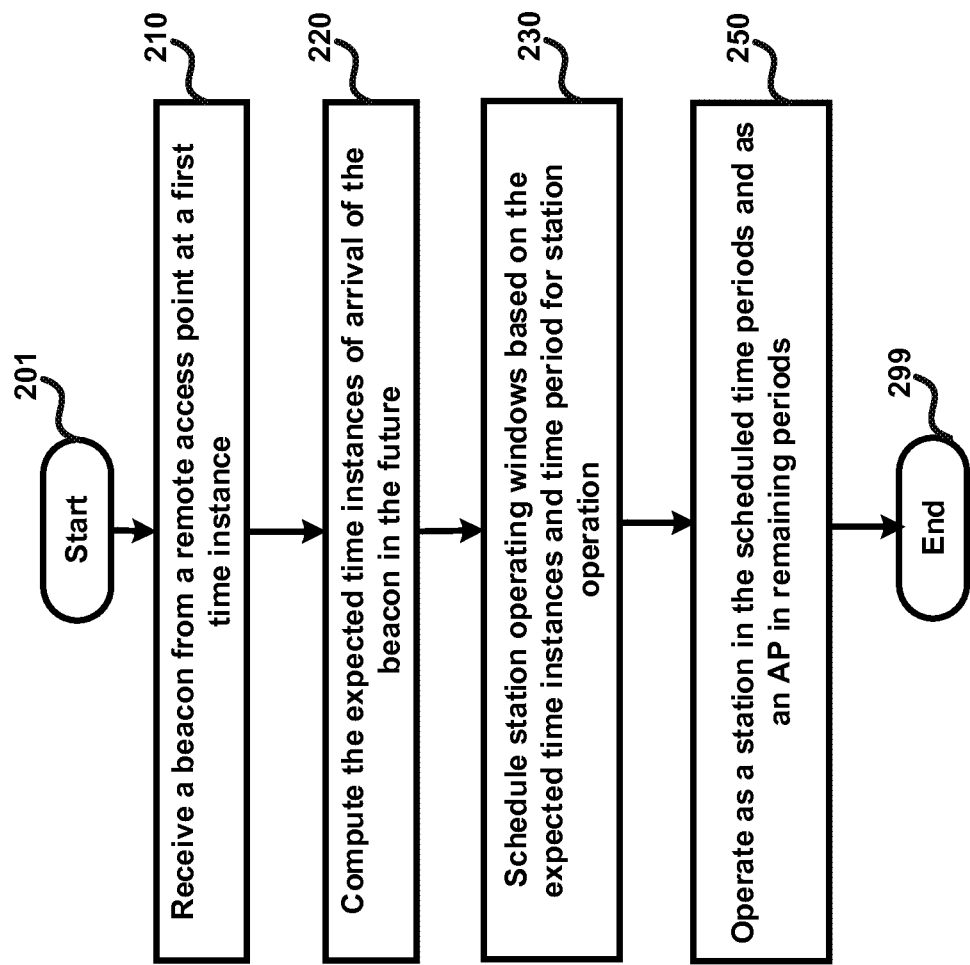
FIG. 2 is a flow chart illustrating the manner in which operating windows of a dual-mode device are adjusted, in an embodiment of the present disclosure.

FIG. 2 is a flow chart illustrating the manner in which operating windows of a dual-mode device are adjusted, in an embodiment of the present disclosure. The flowchart is described with respect to the environment of FIG. 1, merely for illustration. However, various features described herein can be implemented in other environments and using other components as well, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, dual-mode device 140 receives a beacon from a remote access point at a first time instance. As is well known in the relevant arts, beacons (frames) are transmitted periodically by an AP in a BSS, indicating availability for stations to join the BSS by associating with the AP. In the example described in FIG. 2, AP 110 is assumed to be the remote access point. Further, the beacon is assumed to have been received when the dual-mode device 140 is operating in a station mode. As described earlier, each of the AP and station modes in the dual-mode device 140 has a corresponding operating window, with each operating window marked by start and end boundaries. Therefore, the beacon of step 210 is assumed to have been received during an operating window corresponding to the station mode of operation, wherein the first time instance is a specific instance of time between the start and end boundaries of the station's operating window.

In step 220, dual-mode device 140 computes the expected time instances of arrival of the beacons in future. As noted above, the time-interval between successive beacon transmissions is known as a beacon interval, and is usually a pre-determined fixed-value of time that is made known to the stations via the beacon frame. The time at which the AP is expected to send a (next) beacon is known as Target Beacon Transmission Time (TBTT). By examining the time instance at which the beacon of step 210 was received, in conjunction with the pre-determined beacon interval, dual-mode device 140 can compute the expected time instance of arrival of future beacons, i.e., the TBTT of the future beacons.

In step 230, dual-mode device 140 schedules station operating windows based on the expected time instances and the time period for station operation. As described above, an administrator typically configures the time periods for which the respective operating windows for AP mode and station mode, are to operate. To prevent packet loss and to maximize the period in which to send and receive packets, it is desirable that the STA operating window covers the expected beacon time instance, and to let the operating window operate for the pre-determined time period. Accordingly, in an embodiment, dual-mode device 140 schedules the start boundary of the operating window of the station based on the expected time instance (i.e., TBTT) of the future beacons, such that the time period of operation as a station is consistent with the time period configured by the administrator, as described above.

In step 250, dual-mode device 140 operates as a station in the scheduled time periods and as an AP in remaining periods. As described above, the time periods configured for the access point and the station are pre-configured by the administrator. Therefore, as the dual-mode device 140 schedules the operating windows as AP and STA consistent with the associated time periods, while ensuring operation as a station based on the expected beacon time instances and the pre-configured period for station operation (per step 230). For example, if the administrator set the station mode's time period as 20 ms and the AP mode's time period as 80 ms, the dual-mode device 140 operates as a station for a time period of 20 ms and as an AP for 80 ms, with the start boundary of the operating window as a station aligned with the TBTT of the next beacon from the remote AP. Thus, when the timing of the beacons deviates from TBTT (i.e., is in variance with expected arrival time), in accordance with FIG. 2, a dual-mode device may adjust its operating windows by calculating the expected time instances of arrival of the future beacons.

According to an aspect of the present disclosure, AP 110 locally measures the desired beacon interval period, typically as a number of clock cycles of an internal clock, and expressing the clock cycles in terms of microseconds. In real-world embodiments, the internal clock is implemented as a timing synchronization function (TSF) timer, which counts a number of clock cycles designed to measure the desired period. TSF is a function specified in IEEE 802.11 wireless local area network (WLAN) standards. The dual-mode device 140 also measures the desired beacon interval period using a local TSF timer so as to schedule the stop boundary of the AP operating window and to schedule the start boundary of the subsequent station operating window.

Occasionally, AP's local clock drifts, meaning the TSF timer of the AP measures the beacon interval period in a manner that is inconsistent with the manner in which the AP measured the beacon interval prior to the clock drift. For example, the TSF timer may need more or less clock cycles to measure a certain unit of time than was previously needed when there was no clock drift (i.e., there is either a lag or acceleration in the timer's measurements). Without knowledge of such clock drift in the AP, the dual-mode device schedules its next station operating window to start at the TBTT of future beacons. Since the AP transmits its beacon either earlier or later (due to the clock drift) than the TBTT of the future beacons, the timing of the beacons deviates from TBTT, which results in the variance noted above. Thus, in accordance with FIG. 2, the dual-mode device may adjust its timer to match the AP's timer, calculate the expected time instances of arrival of the future beacons based on the adjusted timer, and schedule the station windows based on the calculated time instances of future beacon arrivals.

The features described above can be implemented in various ways, as will be apparent to a skilled practitioner based on the disclosure provided herein. The description is continued with respect to some example embodiments.

4. Adjusting Operating Windows Based on Future TBTTs

Figure 3:
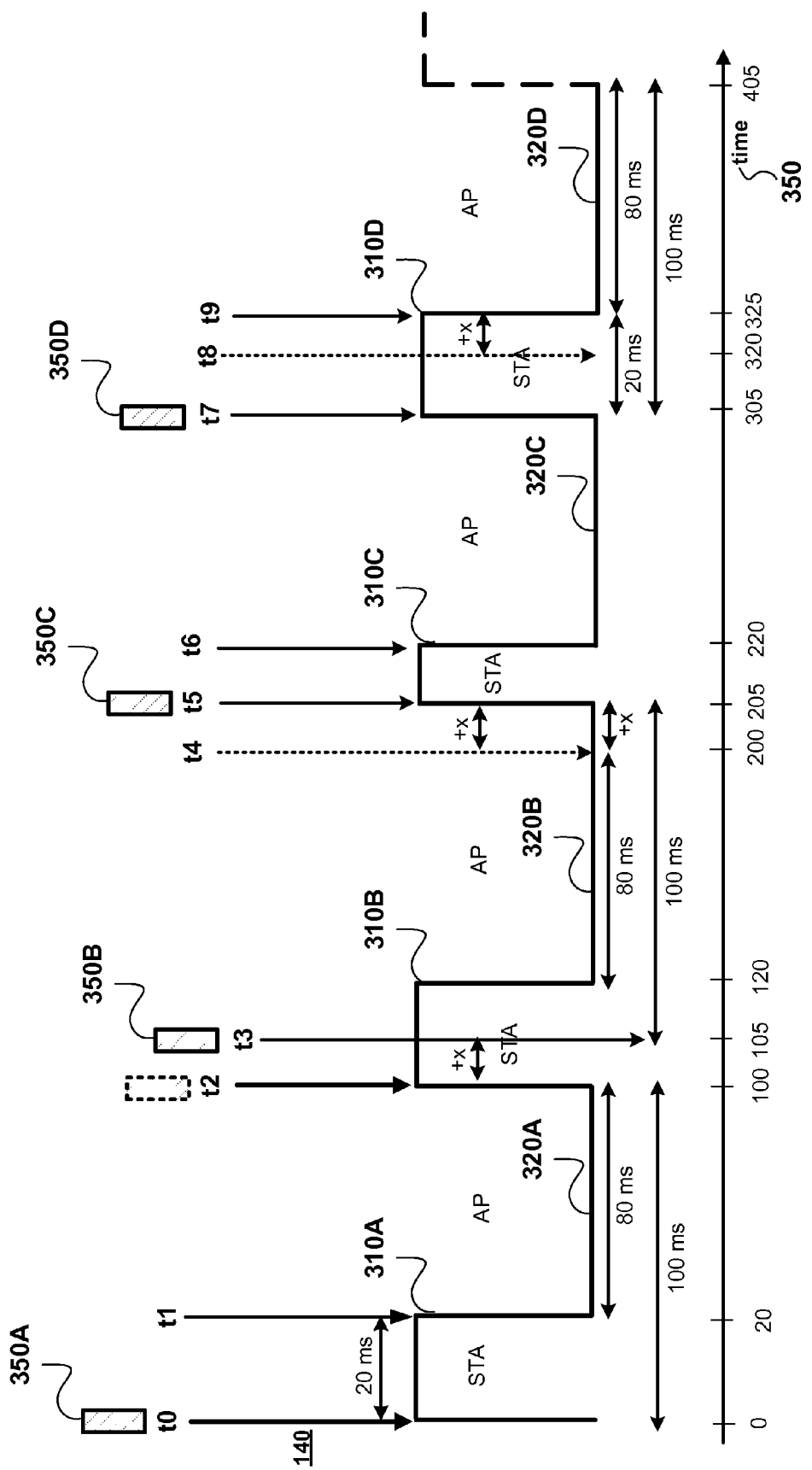
FIG. 3 depicts the adjustment of operating windows when beacons are received later than expected time, in an embodiment of the present disclosure.

FIG. 3 depicts the adjustment of operating windows of dual-mode device 140 when the beacons are received later than an expected time, in an embodiment. The delay in receiving the beacons is due to TSF timer of the AP counts slower than the TSF timer of the dual-mode device 140.

For the purposes of illustration, dual-mode device is shown with four operating windows in STA mode, 310A, 310B, 310C and 310D, and with four operating windows in AP mode, 320A, 320B, 320C and 320D. Various times t0-t9 are shown as values on a temporal scale, represented as time 350.

Operating windows 310A and 320A represent the dual-mode device's normal course of operations. The time duration of STA operating window 310A is shown via start and end boundaries, represented by times t0 (start) and t1 (end) respectively. Similarly, the time duration of AP operating window 320A is shown via start and end boundaries, represented by times t1 (start) and t2 (end) respectively. As pre-configured by the administrator, the time period for the STA operating window 310A is 20 milliseconds, and the time period for the AP operating window 320A is 80 milliseconds, for a total pre-configured time period for the dual-mode device 140 at 100 milliseconds (ms) (the sum of the operating time periods for STA and AP modes).

The dual-mode device 140 begins operating at time t0 as an STA. Time t0 also represents the instance of time at which a first beacon 350A is received by dual-mode device 140 from AP 110. Once the beacon 350A is received, STA 310A processes the beacon and determines the beacon interval (i.e., the difference in time between the current beacon 350A and the TBTT of the next beacon 350B). The beacon interval is assumed to be 100 ms, and therefore the TBTT of the next beacon is shown as time t2, which is 100 ms from time t0. Dual-mode device 140 configures the switch-over time from the next AP operating window to the next STA operating window at time t2.

The dual-mode device 140 switches over to operating as AP 320A at time t1. During AP's time period of 80 ms thereafter, AP 320A performs various functions as part of the normal course of operations as an AP, as is well known in the relevant arts. As noted above, time t2 represents the time when the dual-mode device 140 switches over to operating as the next STA 310B. Time t2 also represents the target beacon transmission time (TBTT) of the next beacon from the remote AP 110, as noted above. However, the next beacon is not received by dual-mode device 140 at time t2. Instead, the next beacon 350B is actually received by dual-mode device 140 at time t3.

As shown, time t2 and time t3 are separated by X ms. Based on the time at which beacon 350B is received, STA 310B calculates the TBTT of the next beacon as time t5, which reflects the beacon interval of 100 ms described earlier. Consequently, dual-mode device 140 configures the switch-over time to operating as an STA 310C at time t5. If there was no delay in receiving the beacon 350B (by X ms), STA 310B would have been switched over to operating as an AP at time instance t4 instead of time instance t5.

Since the beacon 350B is received by the dual-mode device 140 with a delay of X ms, and since the STA 310C is scheduled to operate starting at time instance t5, instead of time instance t4, AP 320B operates by X ms longer than expected.

The dual-mode device 140 switches over to operating as STA 310C at time t5, X ms after the expected time t4. However, the end boundary of STA 310C's operating window is still scheduled at time t6. Therefore, STA 310C does not operate as an STA for the full 20 ms. Instead, STA 310C's operating time is reduced by X ms. As scheduled, the dual-mode device 140 switches over to operating as AP 320C at time t6.

AP 320C operates as an AP until time t7, at which time dual-mode device 140 switches over to operating as STA 310D. As shown, the next beacon 350D is received at time t7 from AP 110. STA 310D's operating window would normally be scheduled to end and switch over as AP 320D at time t8. However, by operation of the several aspects of the present disclosure, dual-mode device 140 configures the start-boundary of AP 320D's operating window at time t9, which adds X ms to the expected start time t8.

Figure 4:
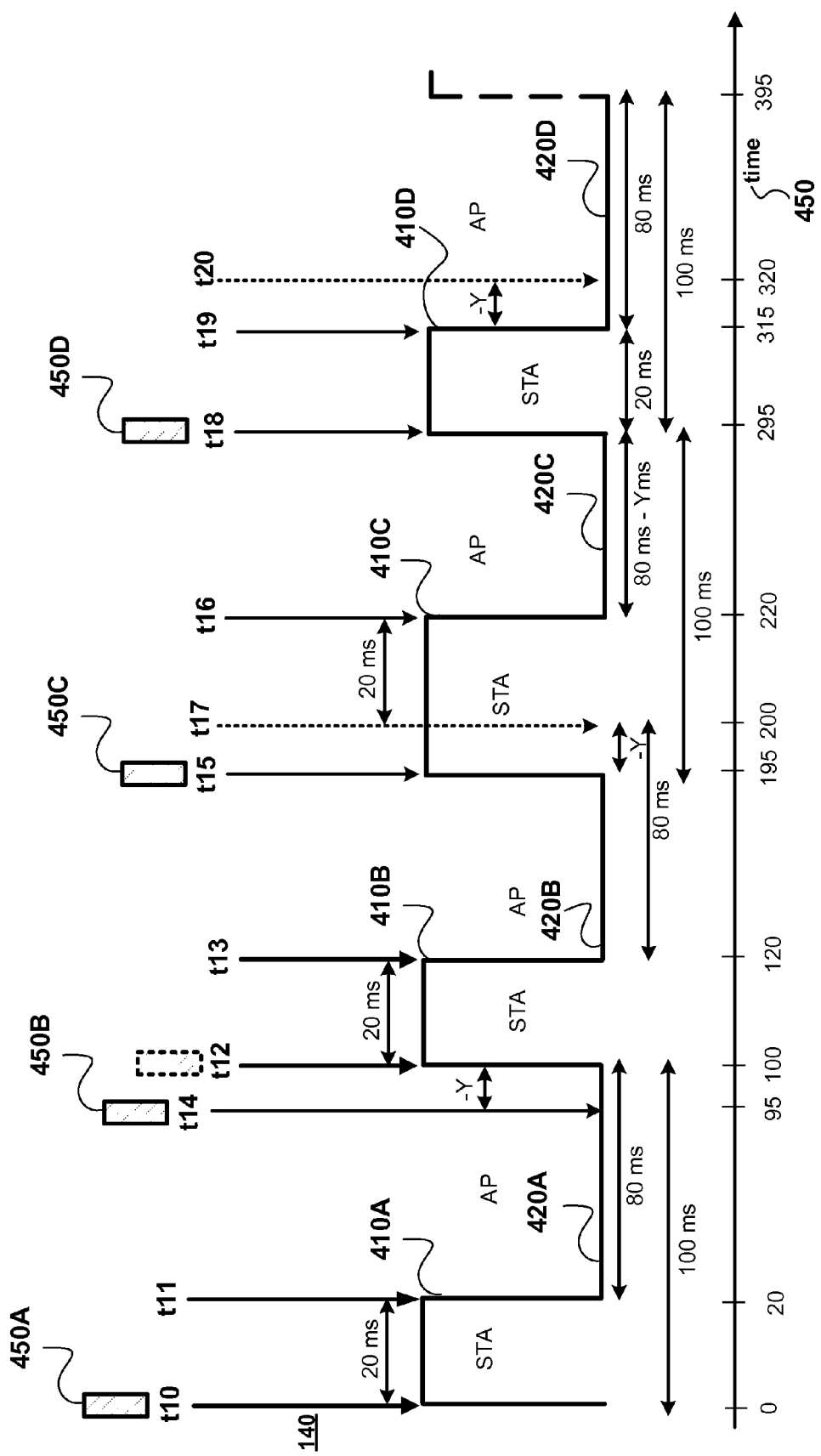
FIG. 4 depicts the adjustment of operating windows when beacons are received earlier than expected time, in an embodiment of the present disclosure.

FIG. 4 depicts the adjustment of operating windows of dual-mode device 140 when the beacons are received earlier than an expected time, in an embodiment. The beacons are received earlier due to TSF timer of the AP completing the programmed count faster than the TSF timer of the dual-mode device 140.

For the purposes of illustration, dual-mode device is shown with four operating windows in STA mode, 410A, 410B, 410C and 410D, and with four operating windows in AP mode, 420A, 420B, 420C and 420D. Various times t10-t20 are shown as values on a temporal scale, represented as time 450.

Operating windows 410A and 420A represent the dual-mode device's normal course of operations. The time duration of STA operating window 410A is shown via start and end boundaries, represented by times t10 (start) and t11 (end) respectively. Similarly, the time duration of AP operating window 420A is shown via start and end boundaries, represented by times t12 (start) and t13 (end) respectively. As pre-configured by an administrator, the time period for the STA operating window 410A is 20 ms and the time period for the AP operating window 420A is 80 ms, for a total pre-configured time period for the dual-mode device 140 at 100 ms.

The dual-mode device 140 begins operating at time t10 as an STA. Time t10 also represents the instance of time at which a first beacon 450A is received by dual-mode device 140 from AP 110. Once the beacon 450A is received, STA 410A processes the beacon and determines the beacon interval. The beacon interval is assumed to be 100 ms, and therefore the TBTT of the next beacon is shown as time t12, which is 100 ms from time t10. Dual-mode device 140 configures the switch-over time from AP 420A to STA 410B at time t12.

The dual-mode device 140 switches over to operating as AP 420A at time t11. Although time t12 represents the target beacon transmission time (TBTT) of the next beacon from the remote AP 110, the next beacon is not received by dual-mode device 140 at time t12. Instead, the next beacon 450B is actually transmitted ahead of time to dual-mode device 140 by AP 110 at time t14. Since the dual-mode device 140 is not in a listening mode to receive beacon 450B, beacon 450B is missed (i.e., not received) by dual-mode device 140. In an embodiment, STA mode 410B may start operating ahead of the expected TBTT, and consequently the dual mode device 140 may receive beacon 450B ahead of the expected TBTT as well. In such a case, since beacon 450B is not missed by dual-mode device 140, dual-mode device 140 may calculate the TBTT of the next beacon as time t15, based on the time t14 where beacon 450B was received.

As shown, time t12 and time t14 are separated by Y ms, indicating that the beacon was transmitted by AP 110 Y ms ahead of the expected TBTT at time t12. Not having received a beacon during the STA mode 410B, dual-mode device 140 schedules the starting boundary of its next operating window duration 410C to start earlier than scheduled. In the embodiment shown in FIG. 4, STA 410C is shown starting at time t15, which is Y ms ahead of the expected start boundary time t17. Although, for ease of description, STA 410C is shown starting Y ms ahead of the expected start time t17, it will be understood by those skilled in the relevant arts that the STA operating windows may take more than one cycle to iteratively adjust their start boundaries such that a beacon is received during operation of dual-mode device in STA mode.

Since STA 410C is scheduled to operate starting at time t15, instead of time t17, AP 420B operates Y ms shorter than expected. Based on the time at which beacon 450C is received, STA 410C calculates the TBTT of the next beacon as time t18. Consequently, dual-mode device 140 configures the switch-over time to operating as an STA 410D at time t18.

The dual-mode device 140 switches over to operating as STA 410D at time t18. AP 420D's operating window would normally be scheduled to start at time t20. However, by operation of the several aspects of the present disclosure, dual-mode device 140 configures the start-boundary of AP 420D's operating window at time t19, which is Y ms ahead of the expected start time.

It may be appreciated that the dual-mode device adjusts operating windows of the corresponding access point and wireless station in order to prevent packet loss and to optimize the time the device operates in each of the dual modes.

Although, for ease of description, the operating windows of STA and AP are shown adjusted (e.g., STA 310D in FIG. 3, and STA 410D in FIG. 4) immediately after a start/end boundary change in preceding stations (e.g., STA 310C in FIG. 3, and STA 410C in FIG. 4), it will be understood by those skilled in the relevant arts that the adjustment to the operating windows may be performed at any time after the missed TBTT (i.e., delayed as in STA 310B of FIG. 3, or early-arrival as in AP 420A/STA 410B of FIG. 4). In an embodiment, the calculations that are performed to determine a change in the pre-determined operating periods of the STA and the AP (due to a missed TBTT), and the consequent adjustment to the operating windows, may be performed on a periodic basis without regard to the time instance at which the TBTT was missed in the first place.

Further, although the particular features of the above disclosure may be described with reference to one or more computational models, the description is continued with respect to a particular formal computational model using which the operating windows are adjusted in an embodiment. The formal computational model is described with reference to example embodiments shown in FIG. 3 and FIG. 4.

With reference to FIG. 3, various times are shown as values on a temporal scale (from 0 ms-405 ms), represented as time 350. In STA 310B, beacon 350B is shown to have been received at 105 ms, 5 ms later than the expected time of 100 ms. As explained above, there may be a mismatch in the periods measured at the AP 110 and the dual-mode device 140, resulting in a variance. Such variance, if unadjusted, accumulates over several beacon intervals and causes further delays/advancements in the TBTT of future beacons. Consequently, STA 310C is shown to start at time 205 ms (e.g., by programming the local TSF timer to count a correspondingly higher number), instead of time 200 ms (i.e., delayed by 5 ms). The calculations for determining the adjustment of the next operating window are assumed to occur at time 205 ms, when dual-mode device 140 switches from operating as AP 320B to STA 310C. First, the actual operating time of AP 320B is calculated as follows:

$$actualOpTimeofAP = (TotalOpTimeofAPandSTA) - (TnextwakeuptimeAP - Tcurrenttime)$$

Here, TotalOpTimeofAPandSTA is the total pre-determined time period for which the device 140 was scheduled to operate as a station and as an access point. In the example of FIG. 3, this TotalOpTimeofAPandSTA is 100 ms. The Tcurrenttime is the time when the dual-mode device 140 switches from operating as AP 320B to operating as STA 310C. In the example of FIG. 3, Tcurrenttime is 205. The Tnextwakeuptime is the time when the dual-mode device 140 is scheduled to switch to operating as AP 320C. In the example of FIG. 3, TnextwakeuptimeAP is 220.

Next the actualOpTimeofAP is calculated as: (100)-(220-205), which is 85 ms. Since the total operating time periods for both modes is 100 ms, and the actual operating time period of the AP mode is calculated at 85 ms, it is calculated that the dual-mode device would operate as an STA for 15 ms (i.e., 100 ms-85 ms) instead of the pre-configured 20 ms. Therefore, dual-mode device 140 adjusts the end-boundary of the STA 310D to end 5 ms later (at time 325 instead of time 320), so that the dual-mode device operates for the full 20 ms in the STA mode. AP 320D thereafter operates for the full 80 ms, and switches over to STA mode at 405 ms.

With reference to FIG. 4, various times are shown as values on a temporal scale (from 0 ms-395 ms), represented as time 450. In AP 420A, beacon 450B is shown to have been transmitted to dual-mode device 140 at 95 ms, 5 ms earlier than the expected time of 100 ms. Consequently, STA 410C is shown to adjust its start boundary to time 195 ms, instead of time 200 ms (i.e., ahead by 5 ms). The calculations for determining the adjustment of the next operating window are assumed to occur at time 195 ms, when dual-mode device 140 switches from operating as AP 420B to STA 410C. First, the actual operating time of AP 420B is calculated as follows:

$$actualOpTimeofAP = (TotalOpTimeofAPandSTA) - (TnextwakeuptimeAP - Tcurrenttime)$$

Here, TotalOpTimeofAPandSTA is the total pre-determined time period for which the device 140 was scheduled to operate as a station and as an access point. In the example of FIG. 4, this TotalOpTimeofAPandSTA is 100 ms. The Tcurrenttime is the time when the dual-mode device 140 switches from operating as AP 420B to operating as STA 410C. In the example of FIG. 4, Tcurrenttime is 195 ms. The Tnextwakeuptime is the time when the dual-mode device 140 is scheduled to switch to operating as AP 420C. In the example of FIG. 4, TnextwakeuptimeAP is 220 ms.

Next the actualOpTimeofAP is calculated as: (100)-(220-195), which is 75 ms. Since the total operating time periods for both modes is 100 ms, and the actual operating time period of the AP mode is calculated at 75 ms, it is calculated that the dual-mode device would operate as an STA for 25 ms (i.e., 100 ms-75 ms) instead of the pre-configured 20 ms (i.e., 5 ms longer). Therefore, dual-mode device 140 adjusts the end-boundary of the STA 310D to end 5 ms earlier (at time 315 instead of time 320), so that the dual-mode device operates for the only the configured time period of 20 ms in the STA mode. AP 420D thereafter operates for the full 80 ms, and switches over to STA mode at 395 ms.

For the purposes of illustration, the magnitudes of time in the time periods of operating windows are represented in milliseconds, while the timer measurements are expressed in microseconds. However, it should be understood that such representations are illustrative, and do not restrict the scope of the present disclosure. For example, real-world embodiments of the present disclosure may express the time periods of operating windows in microseconds as well. All such alternative ways of expressing the magnitude of time are considered to be within the scope, spirit and intent of the present disclosure.

The implementation details of a dual-mode device in an embodiment of the present disclosure are provided next.

5. Example Implementation

Figure 5:
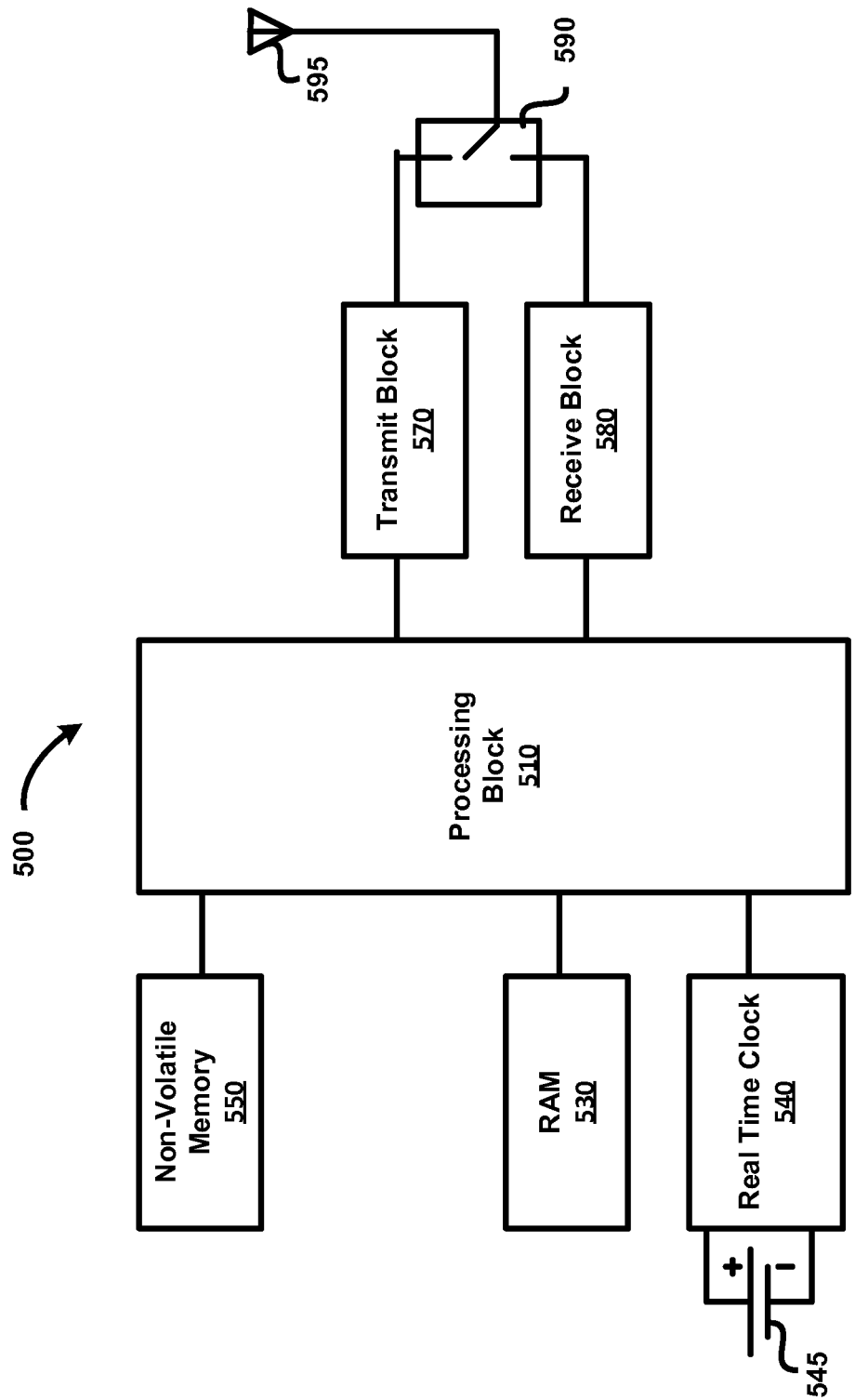
FIG. 5 is a block diagram illustrating the implementation details of a dual-mode device in an embodiment of the present disclosure.

FIG. 5 is a block diagram showing the implementation details of a dual-mode device in an embodiment of the present disclosure. Device 500 can correspond to dual-mode device 140 of FIG. 1, and is shown containing processing block 510, random access memory (RAM) 530, real-time clock (RTC) 540, battery 545, non-volatile memory 550, transmit block 570, receive block 580, switch 590, and antenna 595. The whole of device 500 may be implemented as a system-on-chip (SoC), except for battery 545 and antenna 595. Alternatively, the blocks of FIG. 5 may be implemented on separate integrated circuits (IC).

Battery 545 provides power for operation of device 500, and may be connected to the various blocks shown in FIG. 5 (although shown connected only to RTC 540). RTC 540 operates as a clock, and provides the 'current' time (e.g., the time shown on the temporal scales in FIGS. 3 and 4) to processing block 510.

Antenna 595 operates to receive from, and transmit to, a wireless medium, corresponding wireless signals (e.g., according to IEEE 802.11 (WLAN) standards). It is assumed that the antenna 595 is designed to support both transmission and reception of packets. Specifically, when device 500 operates as an STA, antenna 595 operates to receive from a wireless medium (e.g., via a remote AP 110), corresponding wireless signals. Similarly, when device 500 operates as an AP, antenna 595 operates to transmit to a wireless medium, corresponding wireless signals (e.g., signals directed to STAs 150 and 160).

Switch 590 may be controlled by processing block 510 (connection not shown) to connect antenna 595 to one of blocks 570 and 580 as desired, depending on whether transmission or reception of wireless signals is required. Switch 590, antenna 595 and the corresponding connections of FIG. 5 are shown merely by way of illustration. Instead of a single antenna 595, separate antennas, one for transmission and another for reception of wireless signals, can also be used. Various other techniques, well known in the relevant arts, can also be used instead.

Transmit block 570 receives, from processing block 510, data to be transmitted on a wireless signal (e.g., according to a wireless standard such as IEEE 802.11), generates a modulated radio frequency (RF) signal (according to the standard), and transmits the RF signal via switch 590 and antenna 595. Transmit block 470 may contain RF and baseband circuitry for generating and transmitting wireless signals, as well as for medium access operations. Alternatively, transmit block 570 may contain only the RF circuitry, with processing block 510 performing the baseband and medium access operations (in conjunction with the RF circuitry).

Receive block 580 represents a receiver that receives a wireless (RF) signal (e.g., a beacon in accordance to IEEE 802.11) bearing data and/or control information (e.g., beacon interval, TBTT) via switch 590, and antenna 595, demodulates the RF signal, and provides the extracted data or control information to processing block 510. Receive block 580 may contain RF as well as baseband processing circuitry for processing a WLAN signal. Alternatively, receive block 580 may contain only the RF circuitry, with processing block 510 performing the baseband operations in conjunction with the RF circuitry.

When device 500 is implemented according to IEEE 802.15.4 standards, transmit block 570, receive block 580, antenna 595 and the corresponding signals would be according to IEEE 802.15.4 standards. In addition, the three blocks are implemented to support AP mode and station mode in accordance with TDM.

Non-volatile memory 550 is a non-transitory machine readable medium (such as flash memory, etc.), and stores instructions, which when executed by processing block 510 (containing one or more physical processors), causes device 500 to operate as described above. In particular, the instructions enable device 500 to operate as described with respect to the flowchart of FIG. 2.

RAM 530 is a volatile random access memory, and may be used for storing instructions and data. RAM 530 and non-volatile memory 550 (which may be implemented in the form of read-only memory/ROM/Flash) constitute computer program products or machine (or computer) readable medium, which are means for providing instructions to processing block 510. Processing block 510 may retrieve the instructions, and execute the instructions to provide several features of the present disclosure.

Processing block 510 (or processor in general) may contain multiple processing units internally, with each processing unit potentially being designed for a specific task. Alternatively, processing block 510 may contain only a single general-purpose processing unit. Processing block 510 may execute instructions stored in non-volatile memory 550 or RAM 530 to enable device 500 to operate according to several aspects of the present disclosure, described above in detail.

In particular, processing block 510 may determine the specific time periods for the STA and AP modes, compute the expected time instances of arrival of future beacons, and schedule operating windows that correspond to STA and AP modes based on the expected time instances of arrival of future beacons as well as the corresponding time periods of operation of the dual modes, in accordance with the features described above.

6. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method performed in a dual-mode device, said method comprising:
receiving a sequence of beacons while operating in a station mode with a first period, wherein said dual-mode device operates in an access point (AP) mode and said station mode in a time division multiplexed (TDM) manner, said dual-mode device operating in said AP mode with a second period, wherein said dual-mode device is capable of receiving beacons only when operating in said station mode but not said AP mode;
computing an expected time instance of arrival at said dual-mode device of a first beacon based on said sequence of beacons;
receiving said first beacon at said dual-mode device at an actual time instance which is in variance with said expected time instance;
re-computing a sequence of future time instances of arrival of respective future beacons based on the variance between the actual and expected time instances of arrival at said dual-mode device;
scheduling a sequence of station windows, with each station window to cover the corresponding future time instance of said sequence of future time instances and to have said first period; and
operating in said station mode in said sequence of station windows and in said AP mode in a sequence of AP windows, wherein each station window of said sequence of station windows is operated alternately with each AP window of said sequence of AP windows in said TDM manner, wherein each AP window has said second period, wherein said receiving of said first beacon, said re-computing, said scheduling and said operating are performed in said dual-mode device.

2. The method of claim 1, wherein each of said station windows has a start boundary and an end boundary, wherein said first period represents magnitude of time between said start boundary and said end boundary of respective station windows,
wherein said re-computing further comprises determining a magnitude of said variance, and
wherein said scheduling further comprises utilizing magnitude of said variance to set the start boundary of each of said sequence of station windows,
wherein said re-computing and said utilizing are also performed in said dual-mode device.

3. The method of claim 2, wherein said computing of said expected time instance is based on a first beacon interval value received as part of said sequence of beacons,
wherein said re-computing of said sequence of future time instances of arrival of respective future beacons is based on said actual time instance as a reference.

4. The method of claim 3, wherein said sequence of beacons is received from a remote access point, wherein said remote access point measures said beacon interval period according to a first measurement locally in said remote access point,
wherein said dual-mode device measures said beacon interval period according to a second measurement locally in said dual-mode device,
wherein said remote access point determines said start boundary of each of said station windows based on said first measurement,
wherein said dual-mode device determines said end boundary of each of said station windows based on said second measurement, and
wherein said magnitude of said variance represents a difference in said first measurement and said second measurement.

5. The method of claim 4, wherein said remote access point, said first beacon, said sequence of beacons and said dual-mode device are in accordance with 802.11 standards,
wherein said remote access point and said station mode of said dual-mode device operate in a first basic service set (BSS), and
wherein said AP mode of said dual-mode device and a plurality of stations operate in a second BSS,
wherein said first measurement is based on a first timing synchronization function (TSF) timer and said second measurement is based on a second TSF timer.

6. The method of claim 5, wherein said actual time instance of receiving said first beacon is later than said expected time instance, said method further comprising:
scheduling an intermediate station window before said sequence of station windows, wherein said intermediate station window has respective start and end boundaries, said intermediate station window's start boundary aligned with a corresponding future time instance of one of said future beacons, wherein said first period corresponding to said intermediate station window is shorter than said first period of said future sequence of station windows, and wherein a start boundary of a first AP window operating immediately after a first station window of said scheduled sequence of station windows is scheduled to start later than previously expected, by magnitude of said variance.

7. The method of claim 5, wherein said actual time instance of receiving said first beacon is earlier than said expected time instance, said method further comprising:
scheduling an intermediate station window before said sequence of station windows, wherein said intermediate station window has respective start and end boundaries, said intermediate station window's start boundary positioned to enable said intermediate station window to receive one of said future beacons, wherein said first period corresponding to said intermediate station window is longer than said first period of said future sequence of station windows, and wherein a start boundary of a first AP window operating immediately after a first station window of said scheduled sequence of station windows is scheduled to start earlier than previously expected, by magnitude of said variance.

8. A non-transitory machine readable medium storing one or more sequences of instructions for enabling a dual-mode device to schedule operating windows, wherein execution of said one or more instructions by one or more processors contained in said dual-mode device enables said dual-mode device to perform the actions of:
receiving a sequence of beacons while operating in a station mode with a first period, wherein said dual-mode device operates in an access point (AP) mode and said station mode in a time division multiplexed (TDM) manner, said dual-mode device operating in said AP mode with a second period, wherein said dual-mode device is capable of receiving beacons only when operating in said station mode but not said AP mode;

computing an expected time instance of arrival at said dual-mode device of a first beacon based on said sequence of beacons;
receiving said first beacon at said dual-mode device at an actual time instance which is in variance with said expected time instance;
re-computing a sequence of future time instances of arrival of respective future beacons based on the variance between the actual and expected time instances of arrival at said dual-mode device;
scheduling a sequence of station windows, with each station window to cover the corresponding future time instance of said sequence of future time instances and to have said first period; and
operating in said station mode in said sequence of station windows and in said AP mode in a sequence of AP windows, wherein each station window of said sequence of station windows is operated alternately with each AP window of said sequence of AP windows in said TDM manner, wherein each AP window has said second period, wherein said receiving of said first beacon, said re-computing, said scheduling and said operating are performed in said dual-mode device.

9. The non-transitory machine readable medium of claim 8, wherein each of said station windows has a start boundary and an end boundary, wherein said first period represents magnitude of time between said start boundary and said end boundary of respective station windows,
wherein said re-computing further comprises determining a magnitude of said variance, and
wherein said scheduling further comprises utilizing magnitude of said variance to set the start boundary of each of said sequence of station windows,
wherein said re-computing and said utilizing are also performed in said dual-mode device.

10. The non-transitory machine readable medium of claim 9, wherein said computing of said expected time instance is based on a first beacon interval value received as part of said sequence of beacons,
wherein said re-computing of said sequence of future time instances of arrival of respective future beacons is based on said actual time instance as a reference.

11. The non-transitory machine readable medium of claim 10, wherein said sequence of beacons is received from a remote access point, wherein said remote access point measures said beacon interval period according to a first measurement locally in said remote access point,
wherein said dual-mode device measures said beacon interval period according to a second measurement locally in said dual-mode device,
wherein said remote access point determines said start boundary of each of said station windows based on said first measurement,
wherein said dual-mode device determines said end boundary of each of said station windows based on said second measurement, and
wherein said magnitude of said variance represents a difference in said first measurement and said second measurement.

12. The non-transitory machine readable medium of claim 11, wherein said remote access point, said first beacon, said sequence of beacons and said dual-mode device are in accordance with 802.11 standards,
wherein said remote access point and said station mode of said dual-mode device operate in a first basic service set (BSS),
wherein said AP mode of said dual-mode device and a plurality of stations operate in a second BSS, and
wherein said first measurement is based on a first timing synchronization function (TSF) timer and said second measurement is based on a second TSF timer.

13. The non-transitory machine readable medium of claim 12, wherein said actual time instance of receiving said first beacon is later than said expected time instance, said actions further comprises:
scheduling an intermediate station window before said sequence of station windows, wherein said intermediate station window has respective start and end boundaries, said intermediate station window's start boundary aligned with a corresponding future time instance of one of said future beacons, wherein said first period corresponding to said intermediate station window is shorter than said first period of said future sequence of station windows, and wherein a start boundary of a first AP window operating immediately after a first station window of said scheduled sequence of station windows is scheduled to start later than previously expected, by magnitude of said variance.

14. The non-transitory machine readable medium of claim 12, wherein said actual time instance of receiving said first beacon is earlier than said expected time instance, said actions further comprises:
scheduling an intermediate station window before said sequence of station windows, wherein said intermediate station window has respective start and end boundaries, said intermediate station window's start boundary positioned to enable said intermediate station window to receive one of said future beacons, wherein said first period corresponding to said intermediate station window is longer than said first period of said future sequence of station windows, and wherein a start boundary of a first AP window operating immediately after a first station window of said scheduled sequence of station windows is scheduled to start earlier than previously expected, by magnitude of said variance.

15. A dual-mode device comprising:
a processing block and a memory, said memory to store instructions which when retrieved and executed by said processing block causes said dual-mode device to perform the actions of:
receiving a sequence of beacons while operating in a station mode with a first period, wherein said dual-mode device operates in an access point (AP) mode and said station mode in a time division multiplexed (TDM) manner, said dual-mode device operating in said AP mode with a second period, wherein said dual-mode device is capable of receiving beacons only when operating in said station mode but not said AP mode;
computing an expected time instance of arrival at said dual-mode device of a first beacon based on said sequence of beacons;
receiving said first beacon at said dual-mode device at an actual time instance which is in variance with said expected time instance;
re-computing a sequence of future time instances of arrival of respective future beacons based on the variance between the actual and expected time instances of arrival at said dual-mode device;
scheduling a sequence of station windows, with each station window to cover the corresponding future time instance of said sequence of future time instances and to have said first period; and operating in said station mode in said sequence of station windows and in said AP mode in a sequence of AP windows, wherein each station window of said sequence of station windows is operated alternately with each AP window of said sequence of AP windows in said TDM manner, wherein each AP window has said second period, wherein said receiving of said first beacon, said re-computing, said scheduling and said operating are performed in said dual-mode device.

16. The dual-mode device of claim 15, wherein each of said station windows has a start boundary and an end boundary, wherein said first period represents magnitude of time between said start boundary and said end boundary of respective station windows, wherein said re-computing further comprises determining a magnitude of said variance, and wherein said scheduling further comprises utilizing magnitude of said variance to set the start boundary of each of said sequence of station windows, wherein said re-computing and said utilizing are also performed in said dual-mode device.

17. The dual-mode device of claim 16, wherein said computing of said expected time instance is based on a first beacon interval value received as part of said sequence of beacons, wherein said re-computing of said sequence of future time instances of arrival of respective future beacons is based on said actual time instance as a reference.

18. The dual-mode device of claim 17, wherein said sequence of beacons is received from a remote access point, wherein said remote access point measures said beacon interval period according to a first measurement locally in said remote access point, wherein said dual-mode device measures said beacon interval period according to a second measurement locally in said dual-mode device, wherein said remote access point determines said start boundary of each of said station windows based on said first measurement, wherein said dual-mode device determines said end boundary of each of said station windows based on said second measurement, and wherein said magnitude of said variance represents a difference in said first measurement and said second measurement.

19. The dual-mode device of claim 18, wherein said actual time instance of receiving said first beacon is later than said expected time instance, wherein said processing block causes said dual-mode device to further perform the actions of:

scheduling an intermediate station window before said sequence of station windows, wherein said intermediate station window has respective start and end boundaries, said intermediate station window's start boundary aligned with a corresponding future time instance of one of said future beacons, wherein said first period corresponding to said intermediate station window is shorter than said first period of said future sequence of station windows, and wherein a start boundary of a first AP window operating immediately after a first station window of said scheduled sequence of station windows is scheduled to start later than previously expected, by magnitude of said variance.

20. The dual-mode device of claim 18, wherein said actual time instance of receiving said first beacon is earlier than said expected time instance, wherein said processing block causes said dual-mode device to further perform the actions of:

scheduling an intermediate station window before said sequence of station windows, wherein said intermediate station window has respective start and end boundaries, said intermediate station window's start boundary positioned to enable said intermediate station window to receive one of said future beacons, wherein said first period corresponding to said intermediate station window is longer than said first period of said future sequence of station windows, and wherein a start boundary of a first AP window operating immediately after a first station window of said scheduled sequence of station windows is scheduled to start earlier than previously expected, by magnitude of said variance.

* * * * *